(12) United States Patent
Lee et al.

(10) Patent No.: US 7,522,781 B2
(45) Date of Patent: Apr. 21, 2009

(54) METHOD AND APPARATUS FOR IMAGE PROCESSING BASED ON A MAPPING FUNCTION

(75) Inventors: Sangkeun Lee, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 565 days.

(21) Appl. No.: 11/056,083

(22) Filed: Feb. 11, 2005

(65) Prior Publication Data

US 2006/0182359 A1    Aug. 17, 2006

(51) Int. Cl.
*G06K 9/00*    (2006.01)
*G06K 9/40*    (2006.01)
*H04N 1/40*    (2006.01)

(52) U.S. Cl. .................. 382/274; 382/162; 382/168; 358/461

(58) Field of Classification Search ................. 382/254, 382/260–261, 264, 274; 358/461
See application file for complete search history.

(56) References Cited

U.S. PATENT DOCUMENTS

| 4,384,336 A | 5/1983 | Frankle et al. ............... 382/49 |
| 5,128,706 A | 7/1992 | Shindo et al. ............... 382/279 |
| 5,991,456 A | 11/1999 | Rahman et al. ............. 382/254 |
| 2002/0171852 A1* | 11/2002 | Zhang et al. ............... 358/1.9 |
| 2003/0012448 A1* | 1/2003 | Kimmel et al. ............. 382/274 |
| 2005/0163393 A1* | 7/2005 | Asari ......................... 382/254 |

OTHER PUBLICATIONS

Drago et. al., "Design of a Tone Mapping Operator for High Dynamic Range Images Based Upon Psychophysical Evaluation and Preference Mapping", Proceedings of SPIE—vol. 5007, Human Vision and Electronic Imaging VIII, Jun. 2003, pp. 321-331.*
Tao and Asari, "Modified Luminance Based MSR for Fast and Efficient Image Enhancement", Proceedings of the 32$^{nd}$ Applied Imagery Pattern Rec. Workshop 2003.*
Larson et. al., "A Visibility Matching Tone Reproduction Operator for High Dynamic Range Scenes", IEEE Transactions on Visualization and Computer Graphics, vol. 3, No. 4, Oct.-Dec. 1997.*
Brainard and Wandell, "Analysis of the Retinex Theory of Color Vision", Journal of Optical Socitey of America, vol. 3 No. 10, Oct. 1986.*
Kimmel et. al., "A Variational Framework for Retinex", Hewlett-Packard Company, Jun. 28, 2001.*

(Continued)

*Primary Examiner*—Bhavesh M Mehta
*Assistant Examiner*—Nathan Bloom
(74) *Attorney, Agent, or Firm*—Kenneth L. Sherman, Esq.; Michael Zarabian, Esq.; Myers Andras Sherman LLP

(57) ABSTRACT

A method for processing a digital input image data indexed to represent positions on a display such that the digital data is indicative of an intensity value for each position. The intensity value for each position is transformed to generate an enhanced value, using a mapping function which transforms the same intensity value of input data to essentially the same intensity value of output data in the luminance channel.

30 Claims, 3 Drawing Sheets

OTHER PUBLICATIONS

Funt et. al., "Luminance-Based Multi-Scale Retinex", Proceedings AIC Colour 97 Kyoto 8th Congress of the International Colour Association, May 1997.*

Edwin H. Land, "An Alternative Technique for the Computation of the Designator in the Retinex Theory of Color Vision", Proceedings of the National Academy of Science USA vol. 83 pp. 3078-3080, May 1986.*

Robert Sobol, "Improving the Retinex Algorithm for Rendering Wide Dynamic Range Photographs", Journal of Electronic Imaging, Jan. 2004, vol. 13(1)/65, SPIE and IS&T 2004.*

Kimmel, "Space Sensitive Coor Gamut Mapping: A Variational Approach", Hewlett-Packard Company 2002, HP Labs.*

Andrew Moore et. al., "A Real-Time Neural System for Color Constancy", IEEE Transactions on Neural Networks, vol. 2, No. 2, Mar. 1991.*

Daniel Jobson et. al., "Retinex Image Processing: Improved Fidelity to Direct Visual Observation", Proc. IS&T/SID Fourth Color Imaging Conference: Color Science, Systems and Applications, 1996.*

Berthold Horn et. al., "Determining Lightness from an Image", Computer Graphics and Image Processing 1974 vol. 3, No. 4, pp. 277-299, Academic Press Inc.*

Alessandro Rizzi et. al., "Unsupervised Corrections of Unknown Chromatic Dominants Using a Brownian-Path-Based Retinex Algorithm", Journal of Electronic Imaging, Jul. 2003, vol. 12(3)/431, SPIE and IS&T.*

E.H. Land, *Color vision and the natural image*, Proc. Nat. Acad. Sci. 1959, pp. 115-129, vol. 45.

E. Land, J.J. McCann, *Lightness and Retinex theory*, Journal of the Optical Society of America, Jan. 1971, pp. 1-11, vol. 61, No. 1.

E. Land, *The Retinex theory of color vision*, Scientific American, 1977, pp. 108-128, vol. 237.

J.J. McCann, *Lesson learned from Mondrians applied to real images and color gamuts*, Seventh Color Conference: Color Science, Systems, and Applications, Nov. 1999, pp. 1-8.

D. Jason, Z. Rahman, and G.A. Woodell, *A multiscale retinex for bridging the gap between color images and the human observation of scenes*, IEEE Trans. on Image Processing, Jul. 1997, pp. 965-976 vol. 6, No. 7.

* cited by examiner

METHOD AND APPARATUS FOR IMAGE PROCESSING BASED ON A MAPPING FUNCTION

FIELD OF THE INVENTION

The present invention relates generally to image processing, and more particularly to a method and apparatus for increasing details in dark regions of an image while maintaining brightness and color constancy.

BACKGROUND OF THE INVENTION

Image processing systems are at the heart of digital image revolution. These systems process the captured digital image to enhance the clarity and details of the image using image processing algorithms. Such algorithms result in images that are substantially more accurate and detailed than previously achieved using older analog methods.

There remains, however, a substantial difference between how an image is perceived by a person and an image captured and reproduced on a display medium. Despite the improvements gained by conventional digital image processing systems, such systems are still deficient in reproducing an image with the same level of detail, color constancy, and lightness of an actual scene as the eye, brain, and nervous system of a human being. This is due in part because the human nervous system has a greater dynamic range compression than is available on current digital systems. Dynamic range compression refers to the ability to distinguish varying levels of light.

The human eye has a dynamic range compression of approximately 1000:1, which means that the human eye can distinguish approximately 1000 levels of light variations. By way of contrast, digital image systems typically use only eight bits per pixel which allows for a dynamic range compression of only 255:1. As a result, a digital image reproduced as a photograph would have far less detail in the darker and brighter regions of the photograph as compared to the actual scene perceived by a viewer.

Many techniques have been developed to compensate for this lighting deficiency. These techniques can be separated into two broad categories: (1) power law or nonlinear techniques ("non-linear transforms"); and (2) retinex techniques. Each have their respective limitations however.

Non-linear techniques use a non-linear relationship to expand one portion of the dynamic range while compressing another. These techniques generally enhance details in the darker regions at the expense of detail in the brighter regions. One problem associated with these non-linear systems is that they provide greater distinctions between pixels regardless of what lightness value a pixel may have been originally assigned. This results in the brighter areas which already have a "washedout" appearance to become even more washed-out. Although these techniques result in better details in the darker regions, they do so at the expense of the brighter areas of the digital image. Further, these methods cannot handle contours and abrupt boundaries well.

Retinex techniques variations increase or decrease the luminance value for a pixel based on the luminance values of surrounding pixels. These techniques are particularly useful for enhancing boundaries between lighter and darker regions of an image. However, such techniques are unsatisfactory for a number of reasons. In one technique, a large uniform zones in the image are grayed out (i.e., shading effect). In another technique a shift in color occurs in some images (i.e., color distortion) and is computationally intensive.

SUMMARY OF THE INVENTION

The present addresses the above shortcomings. It is an object of the present invention to provide a method of improving a digital image so that the image appears similar to what is perceived by human vision in all kinds and levels of lighting across the entire scene. As such, in one embodiment the present invention provides a method and apparatus for processing an image wherein a path is defined as a set of locations distributed over an entire input data. A tone mapping function is created by comparing intensity values based on retinex path computation scheme without selecting paths, which transforms each entry of input data into the enhanced value.

In another embodiment, the present invention provides an example image processing method based on retinex theory, with at least the following differences compared with the conventional retinex-based algorithms: 1) the example method operates only on a luminance channel while the conventional methods operate on three different color channels, 2) the example method does not cause shading effect; 3) the example method does not cause color distortion; and 4) the example method utilizes a tone mapping function which maintains the intensity value of input data to the intensity value of output data, whereas conventional retinex methods map the input intensity values to different output values according to local and global information of the input data.

Other embodiments, features and advantages of the present invention will be apparent from the following specification taken in conjunction with the following drawings.

DETAILED DESCRIPTION OF THE INVENTION

A example method and apparatus of improving details in a digital image according to an embodiment of the present invention is described. Accordingly, details for a digital image are enhanced while brightness and color constancy are preserved. At a given point (e.g., pixel) in the image, a determination is made as to whether the pixel "path elements" constituting a path are brighter or darker than the point. The output of the given point is adjusted to generate an enhanced value from averaging the outputs of path-computations selected against the given point.

Figure 1:
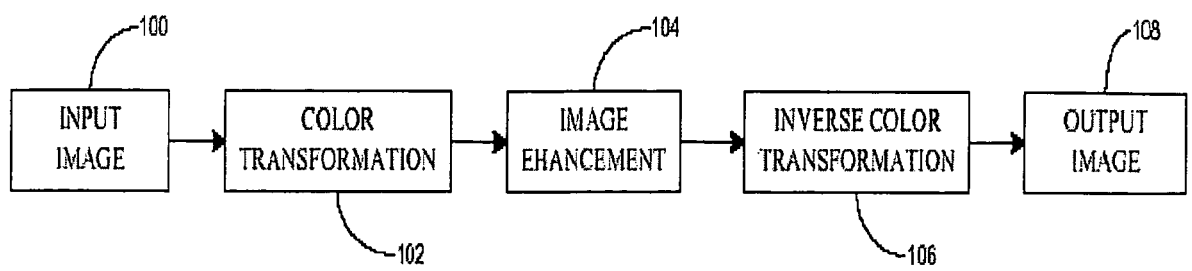
FIG. 1 shows a functional block diagram of an embodiment of an image processing according to the present invention.

FIG. 1 shows a block diagram of an image processing system 10 according to an embodiment of the present invention. An image is captured and digitized in block 100 according to well-known techniques, wherein the digitized image is represented by discrete areas referred to as pixels. In one example, the digitized image comprises three color channels, which are Red, Green, and Blue channels (also known as RGB). The color channels may be transformed into other color spaces such as CIE and YUV (Y represents luminance, U a first color difference, and V a second color difference).

According to the embodiment of the present invention described herein, the digitized image is transformed to YUV space in a transformation block 102. Each pixel is assigned a Y UV value. The Y value controls the brightness for that particular pixel. Conventional systems typically utilize eight bits to represent the Y value due to bandwidth efficiency and memory design considerations. Therefore, conventional image processing systems assign each pixel a Y value somewhere in the range of 0 to 255, with 0 representing the darkest luminance and 255 representing the brightest luminance.

Then, in an image enhancement block 104, image enhancement techniques are used to emphasize and sharpen image features for display. Such enhancement techniques operate in the spatial domain by manipulating the pixel data, or operate in the frequency domain by modifying the spectral components. The example enhancement technique according to the present invention, operates in the spatial domain, and more particularly, applies a transform only on the luminance value Y.

The example technique essentially enhances the details in the darker regions of the digitally recorded images without washing out the details at the brighter ends, thereby making the digitally recorded images more realistic with respect to an actual viewer. The example technique further reduces graying out of large uniform zones of color as occurs using conventional techniques. The example technique also reduces color shift as it operates only on the Y channel. In addition, the example technique is computationally efficient and fast as it operates only on the Y channel.

An inverse color transformation block 106 then transforms the enhanced image from YUV color channels back to RGB color channels using a rotation matrix. The enhanced RGB image is then output by block 108.

Figure 2:
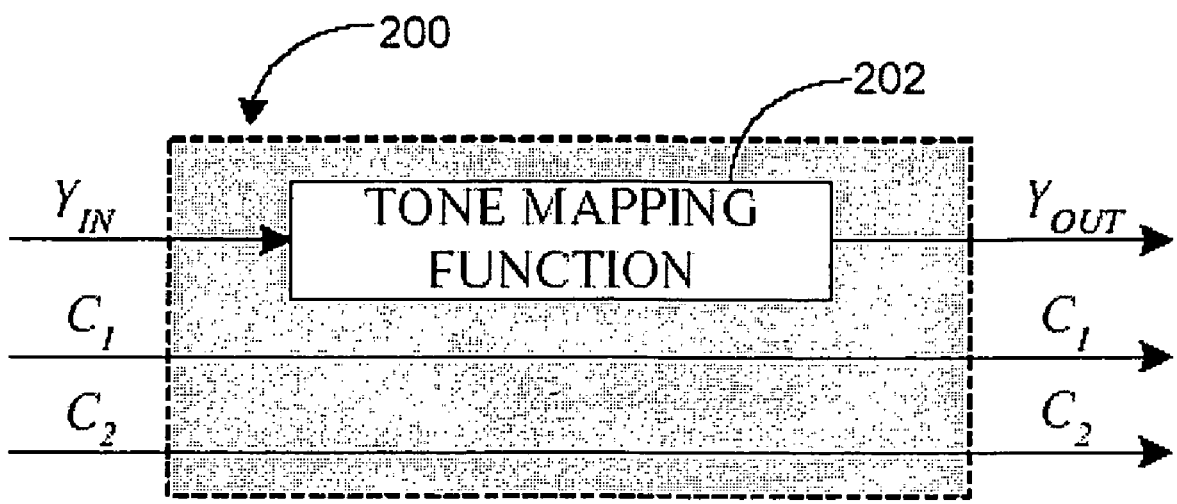
FIG. 2 shows a functional block diagram of an embodiment of an image enhancer according to the present invention.
Figure 3:
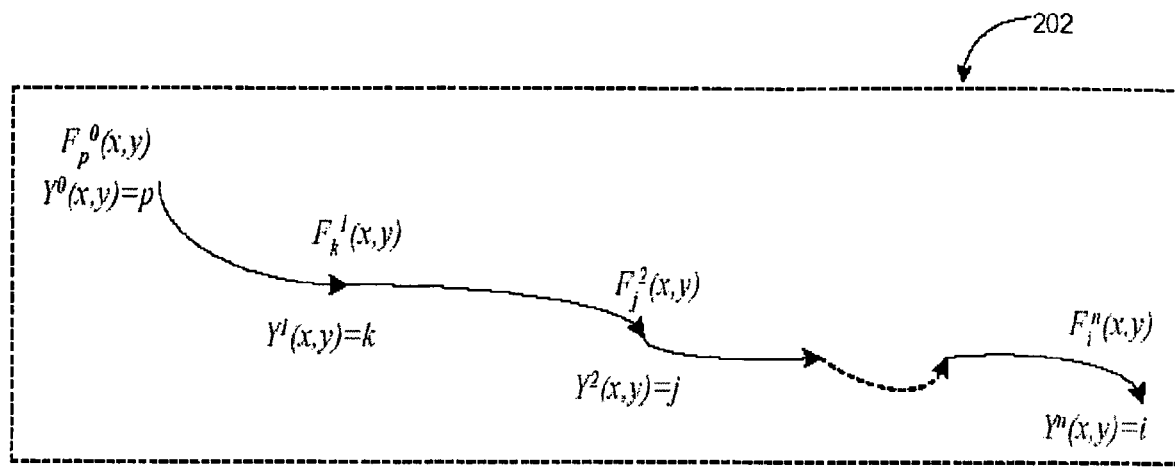
FIG. 3 shows example computation steps performed by an image enhancer according to an embodiment of the present invention.

FIG. 2 is a block diagram of an image enhancer 200 in accordance with an embodiment of the present invention, comprising a tone mapping function generator 202, wherein two color difference components (C1 and C2) pass through the enhancer 200. FIG. 3 shows the details of an embodiment of the mapping function generator 202, illustrating a path in the enhancer 200 to be calculated. According to the present invention, select paths and their computations is not required. However, to simplify understanding of the present invention, an example is presented. It is preferred that the number of elements in a path ("path length"), be as many as possible. Further, a number of paths may be selected and averaged after computing same measures for each path to obtain a updated value for a pixel value.

One example path computation is presented because same computation is applied to the rest of paths if another path exists. Most image enhancement algorithms usually perform on Log-scaled space for computation efficiency and more dynamic range compression issue. However, for explanatory convenience, all descriptions here initially utilize conventional decimal space.

Referring to the example in FIG. 3, starting at a random pixel denoted as $Y^0(x, y)$ and following a random path (a sequence of pixels) to an end position $Y^n(x, y)$, along the way a sequence of pixels denoted as $Y^1(x, y), Y^2(x, y), \ldots,$ are visited. An intermediate output $F_p^n(x, y)$ is defined at the $n^{th}$ element in the path. It is worth noting that each alphabet symbol, p, corresponding to intensity value $Y^n(x, y)$ at $n^{th}$ element is not intensity value but element position of a path in xy image plane. The example path computation is as follows.

1. Assign an initial value $\alpha_0$ to $F_p^0(x, y)$, wherein the initial value $\alpha_0$ is maximum intensity value of an input image data, where:

$$F_p^0(x, y) = \alpha_0 \quad (1)$$

2. Computer the ratio of $Y^1(x, y)$ to $Y^0(x, y)$ at position k according to relation (2) below:

$$Y^1(x, y)/Y^0(x, y) \quad (2)$$

wherein this value is assigned to $F_k^1(x, y)$.

3. Move to a position j, and determine the ratio of $Y^2(x, y)$ to $Y^1(x, y)$ by taking the product of the value $F_k^1(x, y)$ according to relation (3) below:

$$\frac{Y^2(x, y)}{Y^1(x, y)} \cdot \frac{Y^1(x, y)}{Y^0(x, y)} = \frac{Y^2(x, y)}{Y^0(x, y)}. \quad (3)$$

This value is assigned to $F_j^2(x, y)$. Then the steps are repeated for the next location/point in the path.

4. At the end of the path, the ratio has been computed between the start position and each location along the path and assigned to (i.e., stored at) the corresponding position. This process is repeated for many different paths with different start and end points. Then, a history of a location's ratio to many different pixels is recorded, and all the ratios are averaged to obtain an estimate of the lightness (e.g., intensity) at a location (known as an averaging procedure).

In summary, the key elements in the retinex computation are to determine a ratio followed by a product along a random path and to average the results over many different paths to obtain estimate of the lightness at a location.

In addition, some versions of the algorithm supplement the ratio and product operations with two further operations: a thresholding operation and a resetting operation. According to threshold-reset operations, an intermediate value $F_n^i(x, y)$ is modified according to relation (4) below:

$$F_i^n(x, y) = \begin{cases} \frac{I^n(x, y)}{I^{n-1}} & \text{if } \frac{I^n(x, y)}{I^{n-1}(x, y)} \cdot F_i^{n-1} < F_i^0 \\ F_i^0 \, o.w. \end{cases} \quad (4)$$

where O.W. indicates "otherwise", $F_i^{n-1}(x, y)$ is the intermediate value at the previous n−1 position. The intermediate values $F_n^i(x, y)$ have a history that accumulates a comparison result with path elements passing through the position i. A pixel location is affected by the pixel locations that a path goes through in an entire input image. It is found that a pixel value is updated by averaging the intermediate values in paths, with respect to global information of an input image, in which the corresponding reference input values are brighter than the current pixel reference value.

An example image processing method according to the present invention approximates the retinex algorithm. Such an image processing method can reduce computational complexity and speed up the process because it need not consider the path elements. As noted, the output of a path comparison can be the average of the path elements which are brighter than a pixel value at the output position. If the pixel position has multiple outputs for multiple paths, the final output is the average of those multiple outputs from multiple paths. It is important to note that the output at a position depends on the length of a path and the order of elements in the path. It is preferred that the number of elements in a path be as many as possible and as random as possible over entire input data.

The conditional probability of an event B in relation to an event A is the probability that event B occurs given that the event A has already occurred, as:

$$P_r(B|A) \quad (5)$$

wherein the conditional probability of an event is determined by dividing both sides of a multiplication rule by $P_r(A)$ according to relation (6) below:

$$P_r(B|A) = \frac{P_r(B \cap A)}{P_r(A)} \qquad (6)$$

Relation (6) can also be expressed by relation (7) below:

$$P_r(B|A) = \sum_{i=1}^{N} P_r(B|A_i), \qquad (7)$$

where $A_i$ is a disjointed subset of A such that $A_1 \cap A_2 \cap \ldots \cap A_N = 0$; and $$A = \sum_{i=1}^{N} A_i. \qquad (8)$$

Based on foregoing statements, a variant framework of retinex method according to an embodiment of the present invention is to obtain a mapping function $\tilde{G}(x_i)$, where $x_i$ is the bin index of the mapping function. Computing the mapping function is as follows.

1. Assign initial values $\beta \cdot \alpha_0 + (1-\beta) \cdot x_i$ to each bin $x_i$ of $G(x_i)$ wherein the value $\alpha_0$ is a maximum value of an input image, and the value $\beta$ is a control gain. The range of the control gain varies from 0 to 1 (e.g., $\beta = 0.5$).
2. From relations (4) and (7) above, if a current position i and its value $x_i$ are affected by the previous value $x_j$ over an entire image, an intermediate output of the mapping function $G(x_i)$ can be expressed according to relation (9) below:

$$G(x_i) = \begin{cases} \frac{x_i}{x_j} \cdot G(x_j) & \text{if } x_i < x_j, \\ G(x_j) & o.w. \end{cases} \qquad (9)$$

where the value of the mapping function $G(x_i)$ is reset to 1 when the previous pixel value is darker than the current pixel value. Therefore, the expected value at the current position $\tilde{G}(x_i)$ is according to relation (10) below:

$$\tilde{G}(x_i) = \sum_{x_j=1}^{x_i} G(x_j) \cdot P_r(x_j) + \sum_{x_j=x_i}^{MAX\_BIN} \frac{x_i}{x_j} \cdot G(x_j) \cdot P_r(x_j). \qquad (10)$$

In relation (10), the value $P_r(x_j)$ is the probability of a value $x_j$ that can be obtained from the normalized histogram of an input data, and MAX_BIN is the maximum bin number allowed to create the mapping function. Note that the intermediate output of the mapping function, $G(x_i)$ is replaced by $\tilde{G}(x_i)$ when the process moves from the current bin index to the next bin index.

3. If iterative processing is necessary, the above Step 2 is repeated, wherein the initial values of the next iteration are the output of the current step. In one implementation, two or three iterations provide satisfactory results. The final output image data Y'(x, y) from input image data Y (x, y) is according to relation (11) below:

$$Y'(x, y) = G(Y(x, y)). \qquad (11)$$

As such, an input image is transformed to an output image by using a tone mapping function (e.g., in block 202 of FIG. 2) according to the present invention, wherein the mapping function is dependent on the contents of the input image.

In summary, the input image is initially represented by digital data indexed to represent positions on a display. The indexed digital data is indicative of an intensity value Y (x, y) for each position (x, y). The intensity value for each position is transformed to generate an enhanced value as:

$$\tilde{G}(x_i) = \sum_{x_j=1}^{x_i} \tilde{G}(x_j) \cdot P_r(x_j) + \sum_{x_j=x_i+1}^{MAX\_BIN} \frac{x_i}{x_j} \cdot \tilde{G}(x_j) \cdot P_r(x_j).$$

where $\tilde{G}(l)$ is a mapping function for an intensity value l, $P_r(l)$ is the probability of a value l that can be obtained from the normalized histogram of input data, and MAX_BIN is the number of intensity values to be considered (e.g., 256). As such, in the example mainly the luminance (Y-component) values are enhanced.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for processing an image, comprising the steps of:
    providing digital input image data indexed to represent positions on a display, said digital data being indicative of an intensity value for each position; and
    transforming said intensity value for each position using a processor to generate an output value, using a path computation scheme mapping function which transforms the intensity value of input data with output data that substantially has the intensity value of the input data,
    wherein the resulting output data is based on probability using a value obtained from a histogram of the input data, and the step of transformation further includes the steps of defining a path as a set of positions distributed over the input image data, wherein the mapping function is based on comparing intensity values using a retinex path computation scheme without selecting paths, such that the intensity value for each position is maintained.

2. The method of claim 1, wherein said intensity value comprises a luminance value.

3. The method of claim 2, wherein the mapping function operates on the luminance channel only.

4. The method of claim 3, wherein the mapping function operates on the luminance channel only without causing shading or color distortion effects.

5. The method of claim 1, wherein: said digital data is indicative of an intensity value Y(x, y) for each position (x, y) in a luminance channel; the step of transforming further includes the steps of transforming said intensity value for each position to generate an enhanced value Y'(x, y) using the mapping function:

$$\tilde{G}(x_i) = \sum_{x_j=1}^{x_i} G(x_j) \cdot P_r(x_j) + \sum_{x_j=x_i+1}^{MAX\_BIN} \frac{x_i}{x_j} \cdot G(x_j) \cdot P_r(x_j)$$

where $\tilde{G}(1)$ is a final mapping function for an intensity value 1, $G(1)$ is an intermediate mapping function, $P_r(1)$ is the probability of an intensity value 1 that can be obtained from the normalized histogram of said digital data, and MAX_BIN is the number of said intensity values to be considered.

6. The method of claim 5, wherein said intensity value comprises a luminance value.

7. The method of claim 5, wherein said transformed intensity value Y'(x, y) is a mapped value for said each input digital value Y(x, y) in accordance with $$Y'(x, y) = \tilde{G}(Y(x, y))$$

wherein the mapping function is dependent on the contents of an input data.

8. The method of claim 5, wherein said maximum bin number MAX_BIN is same as the number of bits allowed to express said intensity value.

9. The method of claim 5, wherein said probability $P_r(1)$ of said intensity value 1 is calculated based on said normalized histogram of said digital data.

10. The method of claim 9, wherein the value of said normalized histogram at each bin 1 is computed using the value of histogram at said each bin 1 divided by the size of said digital data.

11. The method of claim 5, further comprising the steps of assigning initial values for the mapping function as:

$$G(x_i) = \beta \cdot \alpha_0 + (1-\beta) \cdot x_i$$

where the value $\alpha_0$ is a maximum intensity value of said input digital data, and the value $\beta$ is an initial control gain.

12. The method of claim 11 wherein said control gain $\beta$ can vary from 0 to 1.

13. The method of claim 5, wherein the intermediate value of said mapping function is defined as:

$$G(x_i) = \begin{cases} \frac{x_i}{x_j} \cdot G(x_j) & \text{if } x_i < x_j, \\ G(x_j) & o.w. \end{cases}$$

wherein the mapping function $G(x_i)$ is reset to 1 when a previous value $x_j$ at a $\tilde{G}(1)$ j is darker than the current value $x_i$ at a position i, and said intermediate output of said mapping function is replaced by $\tilde{G}(x_i)$ when a process moves from the current bin index $x_i$ to the next bin index $x_i+1$.

14. The method of claim 5, wherein said mapping function for each bin index 1 is performed for $1 \leq 1 \leq MAX\_BIN$.

15. A method of processing a digital image having pixels, comprising the steps of:
transforming the RGB channels in the image to a luminance Y channel and two color difference channels;
defining a path as a set of pixel luminance positions distributed over the input image;
approximating path computations without visiting an ordered sequence of said luminance positions to reach at a target position only in said luminance channel;
providing a mapping function using probability of the luminance value at the target position based on a normalized histogram of said input image;
transforming said target position luminance value using a processor to generate an output value, and using said mapping function to transform the luminance value of the output value, to substantially the same intensity value as the input value and inverting the luminance value and said two color difference channels into RGB channels as an output image to enhance details in darker regions of the input image without washing out details at brighter ends of the input image.

16. A system for processing a digital input image data indexed to represent positions on a display, said digital data being indicative of an intensity value for each position, comprising:
an image adjuster module that transforms said intensity value for each position to generate an output value, the image adjuster module including a path computation scheme tone mapping function which substantially maintains the intensity value of input data for output data,
wherein the tone mapping function transforms the input data to output data based on probability using a value obtained from a histogram of the input data, and wherein the image adjuster module further defines a path as a set of positions distributed over the input image data, wherein the mapping function is based on comparing intensity values using a retinex path computation scheme without selecting paths, such that the intensity value for each position is adjusted.

17. The system of claim 16, wherein said intensity value comprises a luminance value.

18. The system of claim 17, wherein the mapping function operates on the luminance channel only.

19. The system of claim 18, wherein the mapping function operates on the luminance channel only, without causing shading or color distortion effects.

20. The system of claim 16, wherein: said digital data is indicative of an intensity value Y'(x, y) for each position (x, y) in a luminance channel; the adjuster further transforms said intensity value for each position to generate an enhanced value Y'(x, y) using the mapping function:

$$\tilde{G}(x_i) = \sum_{x_j=1}^{x_i} G(x_j) \cdot P_r(x_j) + \sum_{x_j=x_i+1}^{MAX\_BIN} \frac{x_i}{x_j} \cdot G(x_j) \cdot P_r(x_j)$$

where $\tilde{G}(1)$ is a final mapping function for an intensity value 1, $G(1)$ is an intermediate mapping function, $P_r(1)$ is the probability of an intensity value 1 that can be obtained from the normalized histogram of said digital data, and MAX_BIN is the number of said intensity values to be considered.

21. The system of claim 20, wherein said intensity value comprises a luminance value.

22. The system of claim 20, wherein said transformed intensity value Y'(x, y) is a mapped value for said each input digital value Y(x, y) in accordance with $$Y'(x, y) = G(\tilde{Y}(x, y))$$

wherein the mapping function is dependent on the contents of an input data.

23. The system of claim 20, wherein said maximum bin number MAX_BIN is same as the number of bits allowed to express said intensity value.

24. The system of claim 20, wherein said probability $P_r(1)$ of said intensity value 1 is calculated based on said normalized histogram of said digital data.

25. The system of claim 24, wherein the value of said normalized histogram at each bin 1 is computed using the value of histogram at said each bin 1 divided by the size of said digital data.

26. The system of claim 20, wherein the adjuster further assigns initial values for the mapping function as:

$$G(x_i) = \beta \cdot \alpha_0 + (1-\beta) \cdot x_i$$

where the value $\alpha_0$ is a maximum intensity value of said input digital data, and the value $\beta$ is an initial control gain.

27. The system of claim 26, wherein said control gain $\beta$ can vary from 0 to 1.

28. The system of claim 20, wherein the intermediate value of said mapping function is defined as:

$$G(x_i) = \begin{cases} \dfrac{x_i}{x_j} \cdot G(x_j) & \text{if } x_i < x_j, \\ G(x_j) & o.w. \end{cases}$$

wherein the mapping function $G(x_i)$ is reset to 1 when a previous value $x_j$ at a positions j is darker than the current value $x_i$ at a position i, and said intermediate output of said mapping function is replaced by $\widetilde{G}(x_i)$ when a process moves from the current bin index $x_i$ to the next bin index $x_i+1$.

29. The system of claim 20, wherein said mapping function for each bin index 1 is performed for $1 \leq 1 \leq \mu MAX\_BIN$.

30. A system for processing a digital image having pixels, comprising:
(a) a color transformer that transforms RGB channels in the image to a luminance Y channel and two color difference channels;
(b) an image enhancer that:
    defines a path as a set of pixel luminance positions distributed over the input image;
    approximates path computations without visiting an ordered sequence of said luminance positions to reach at a target position only in said luminance channel;
    utilizes a mapping function that uses probability of the luminance value at the target position based on a normalized histogram of said input image;
    transforms said target position luminance value using said mapping function to transform the intensity value of an output value, to substantially the same intensity value as the input value to enhance details in darker regions of the input image without washing out details at brighter ends of the input image; and
(c) an inverse color transformer module that inverts the output luminance value and said two color difference channels into RGB channels as an enhance output image.

* * * * *